Nov. 5, 1929.  J. H. KNOWLES  1,734,813
BAR SCREEN SCRAPER
Filed Nov. 9, 1928   5 Sheets-Sheet 4

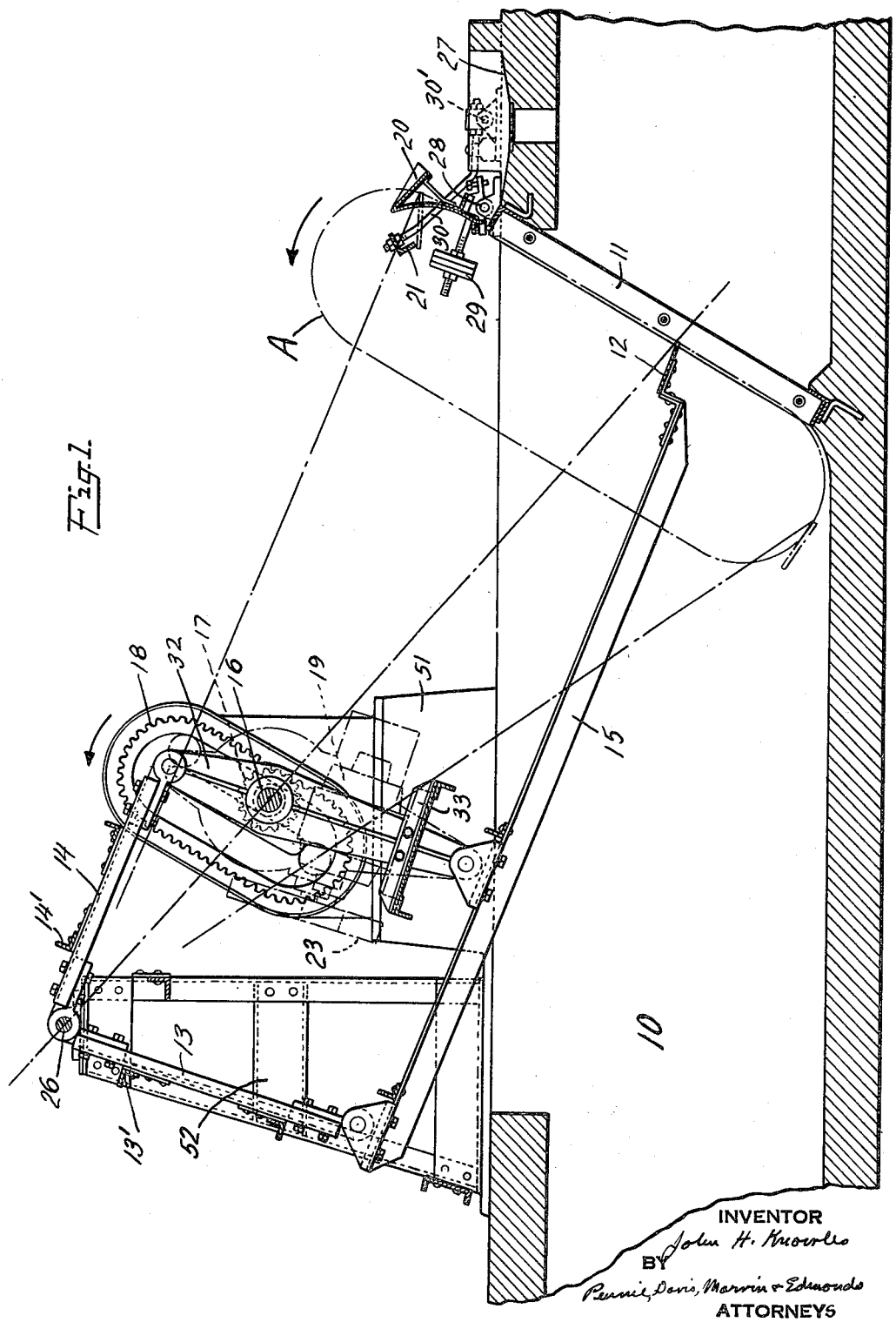

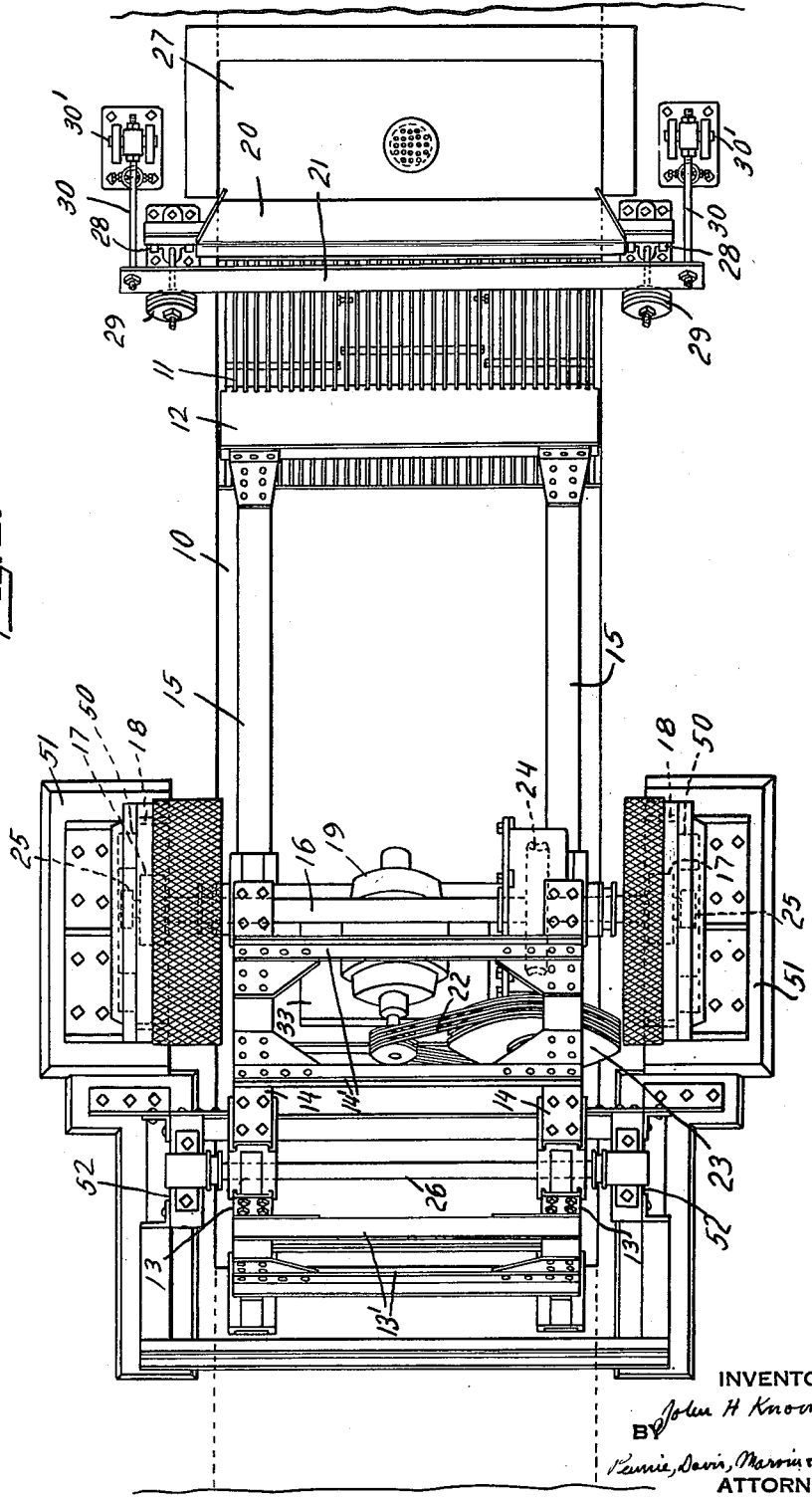

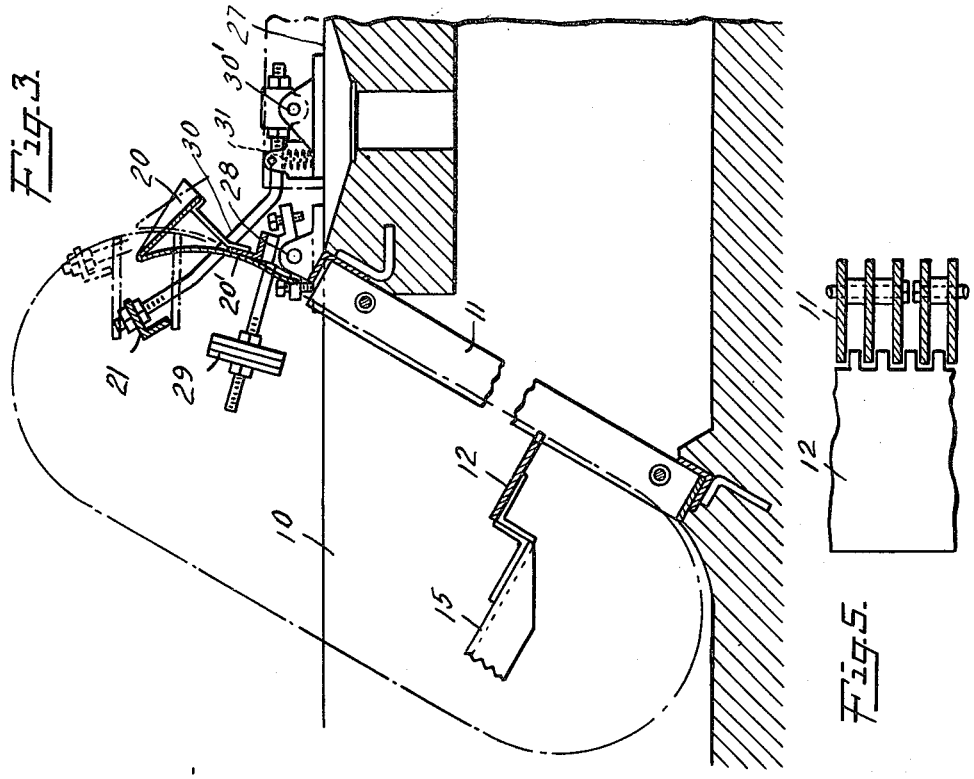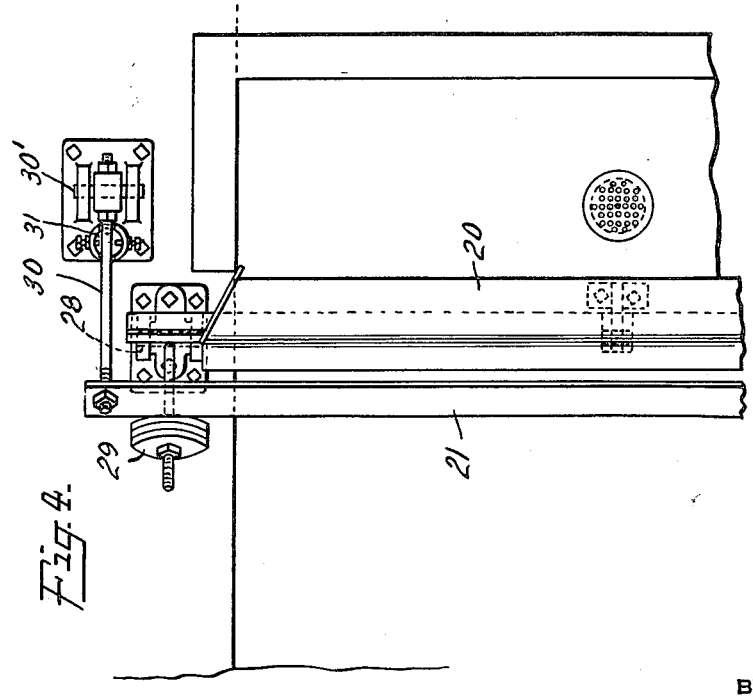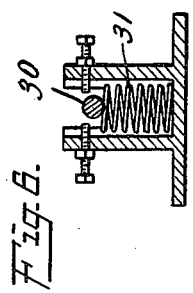

INVENTOR
John H. Knowles
BY
Pennie, Davis, Marvin & Edmonds
ATTORNEYS

Nov. 5, 1929.  J. H. KNOWLES  1,734,813
BAR SCREEN SCRAPER
Filed Nov. 9, 1928  5 Sheets-Sheet 5
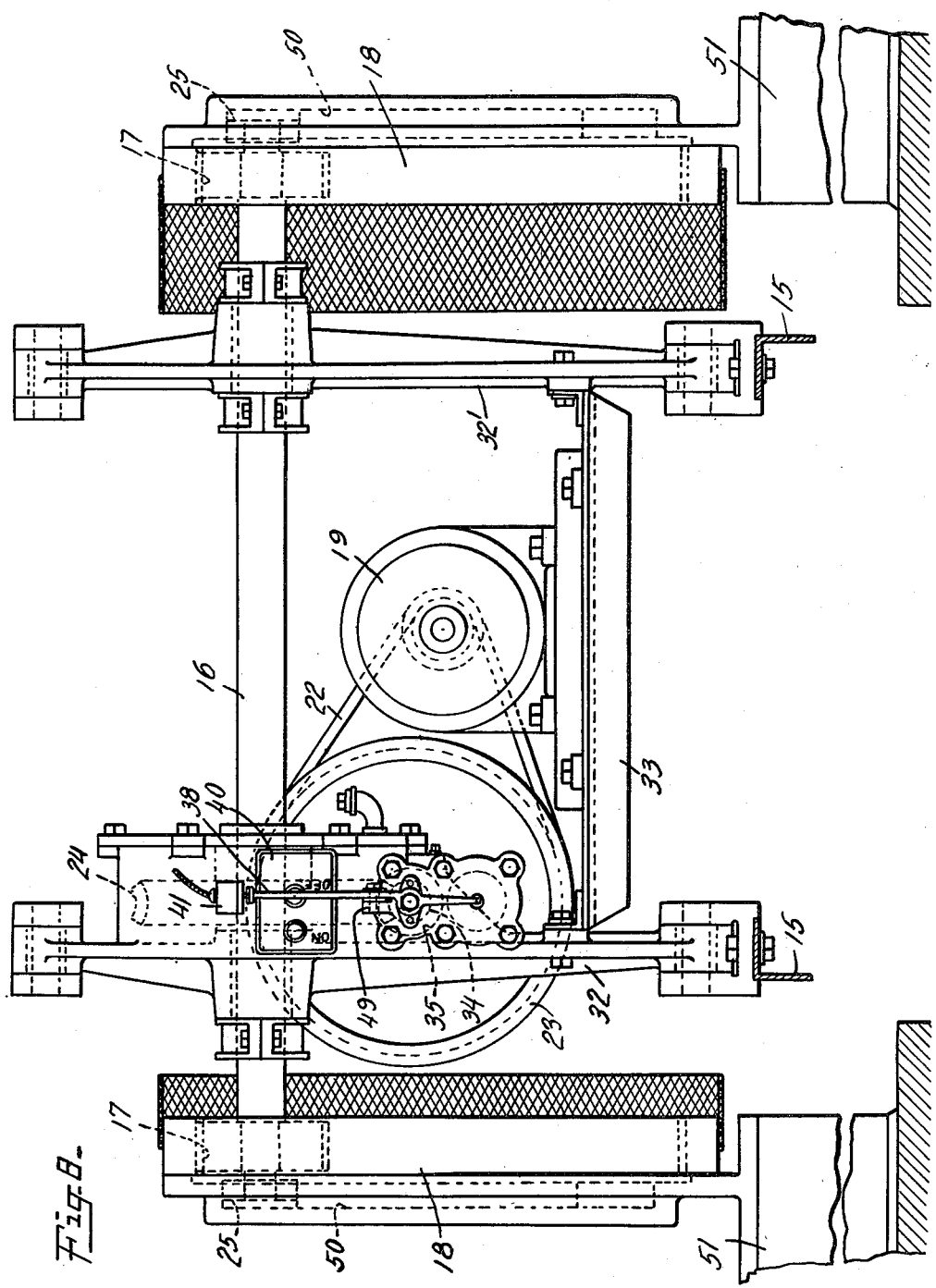

Patented Nov. 5, 1929

1,734,813

UNITED STATES PATENT OFFICE

JOHN H. KNOWLES, OF SCARSDALE, NEW YORK, ASSIGNOR TO THE DORR COMPANY, OF NEW YORK, N. Y., A CORPORATION OF DELAWARE

BAR-SCREEN SCRAPER

Application filed November 9, 1928. Serial No. 318,303.

This invention relates to scraping mechanisms for bar screens and has for its object the provision of an improved scraping mechanism for such screens.

The improved scraping mechanism of the invention, while applicable to bar screens in general, is particularly applicable to bar screens used for removing relatively large solids from flowing streams, particularly municipal and industrial sewage. A coarse bar screen is an integral part of almost every sewage treatment plant. Such a screen consists of inclined iron bars spaced apart from ½ inch to 2½ inches according to conditions. Sticks, rags, paper and other coarse material in the sewage, are caught on the bars and prevented from passing on to the subsequent steps in the sewage treatment or disposal practice. The accumulation of this coarse material on the bars is always unsightly and often malodorous, and various expedients, both manual and mechanical, have been resorted to for its removal from the screen.

The manual removal of this coarse material has obvious disadvantages, such, for instance, as the intermittent and often irregular, as well as disagreeable nature of manual cleaning. Of the mechanical scraping devices heretofore proposed, some are objectionable because of the multiplicity of moving parts both under and above the liquid surface; others because they necessitate radical changes in existing equipment, while others require excessive power consumption for operation. For the most part, mechanical bar screen scraping mechanisms for raking straight bars have heretofore embodied submerged parts working on one another, which is highly objectionable because of the effect of the grit in the sewage and more particularly because of the tendency of rags, paper and other stringy matter to clog parts moving on one another beneath the liquid surface. On the other hand, submerged moving parts have been eliminated in certain mechanical scraping mechanisms for raking curved bars.

The improved scraping mechanism of the present invention is particularly adapted for raking straight bars and is free from chains, cables, and submerged bearings, guides or other parts working on one another. The improved scraping mechanism can be readily applied to existing bar screen installations without any change in the bar screen itself. Furthermore, the improved scraping mechanism is self-contained so that its installation requires only the provision of appropriate supports at the sides of the sewer channel, and may be readily applied to channels of varying widths, different lengths of bar and various bar inclinations.

The features of the invention which I consider patentably novel are definitely indicated in the claims appended hereto. The construction and mode of operation of a bar screen scraping mechanism embodying the invention will be understood from the following description taken in connection with the accompanying drawings, in which:—

Fig. 1 is a side elevation partly in section of a bar screen scraping mechanism embodying the invention;

Fig. 2 is a top plan of the mechanism;

Fig. 3 is an enlarged side elevation, partly in section, of the rake and cleaning means therefor;

Fig. 4 is an enlarged plan of the rake cleaning means;

Fig. 5 is a detail of the bar screen and rake;

Fig. 6 is a detail of the spring check of the scraper arm;

Fig. 8 is an enlarged view of the rake driving mechanism.

Figure 7:
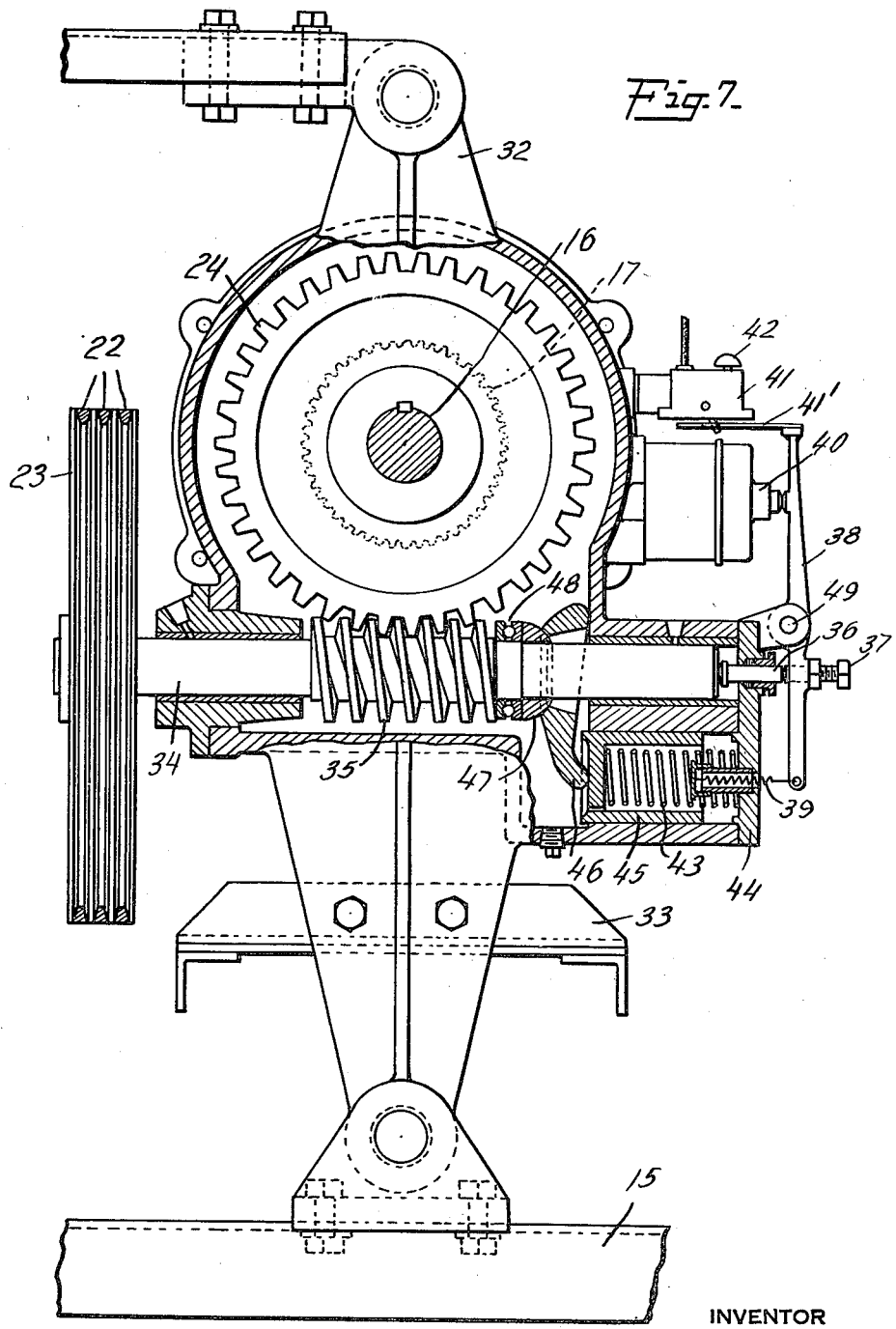
Fig. 7 is an enlarged detail view of the worm drive and control means.

Referring to Fig. 1 of the drawings, a straight bar screen 11 is shown mounted in a sewer channel 10. The bars of the screen are inclined upwardly in the direction of the sewage flow, from left to right in Fig. 1. The bars of the screen 11 are adapted to be scraped or cleaned by a moving rake or scraper 12. The rake is preferably provided with teeth projecting a short distance within the spaces between the parallel bars of the screen, as indicated in Fig. 5 of the drawings.

The operative or scraping end of the rake 12 is caused to move in the path indicated by the line A on the drawings by a driving mechanism now to be described.

The rake 12 is secured to the extremities of two parallel arms or supports 15. The other extremities of the arms 15 are pivotally supported at the lower end of depending arms 13. The arms 13 are rigidly united in appropriately spaced relation by cross bars 13'.

The upper ends of the arms 13 are pivotally mounted on, and near the opposite ends of, a stationary transverse shaft 26. The shaft 26 is mounted on the top of a supporting frame 52, adapted to rest on the top of the channel 10 and on opposite sides thereof. Arms 14 are also pivotally mounted on the stationary shaft 26 approximate the mounting on that shaft of the depending arms 13. The arms 14 are above and always parallel with the arms 15. Like the arms 13, the arms 14 are rigidly united in appropriate spaced relation by crossbars 14'.

The upper ends of depending beams 32 and 32' are pivotally mounted to the movable end of each of the arms 14, while the lower ends of the beams are pivotally mounted on the corresponding lower rake-supporting arms 15. The beams 32 and 32' are always parallel to arms 13.

A transverse shaft 16 is journaled or otherwise rotatably mounted in appropriate bearings on the beams 32 and 32'. The shaft 16 extends at each end beyond the beams and carries at its extremities, guide rollers 25 (see Figs. 2 and 8) adapted to engage oval-shaped guide races 50 rigidly supported, at an appropriate inclination, on bases 51, adapted to rest on the opposite sides of the channel 10. Pinions 17 are also secured to the shaft 16, adjacent to the guide rollers 25 and mesh with or cooperatively engage internally toothed oval-shaped racks 18. The racks 18 are stationary and are rigidly supported, at a corresponding inclination and adjacent to the guide races, on the bases 51. The oval shape of the racks 18 and the guide races 50 as well as the inclination conforms with the oval path A of the rake 12.

The pinions 17 are adapted to be positively driven by an electric motor 19, or other appropriate motive means, supported on a bracket 33 rigidly secured between the beams 32 and 32' below the shaft 16. The motor 19 is operatively connected by a rope drive 22 (see Figs. 2, 7 and 8) to a rope sheave 23 secured to one end of a shaft 34 below and extending at right angles to the shaft 16. The shaft 34 is journaled or otherwise rotatably mounted in suitable bearings in the lower part of the beam 32, and is provided, intermediate its ends, with a worm 35. The worm 35 operatively engages a gear 24 (see Fig. 7) keyed to the shaft 16.

The driving mechanism (for the rake 12) just described operates on the pantograph principle; the driving of the pinions 17 (by the motor 19) carrying these pinions (and the shaft 16) around the oval rack 18 in a counter clockwise direction, as indicated by the arrow on Fig. 1. The shaft 16, being mounted in the beams 32 and 32', carries those beams with it, and in so doing provides the motive means for appropriately moving the rake-supporting arms 15. The linkages are so proportioned that the rake-supporting arms 15 are always parallel with the corresponding upper arms 14, while the arms 13 are always parallel with the corresponding beams 32 and 32'. Furthermore, the transverse shaft 16 is so positioned on and supported by the beams 32 and 32' that the movement of this shaft in its oval path (determined by the oval-shaped races 50 and racks 18) moves the rake 12 in a corresponding, but larger, oval path. The relative motions of the shaft 16 and the rake 12 are directly proportional to the distances of the shaft and the rake from the stationary shaft 26. The rake 12, the shaft 16 and the shaft 26 are always in the same straight line, as indicated in Fig. 1.

An increase of the load on the rake 12 increases the end thrust on the shaft 34 (see Fig. 7). The shaft 34 is free to move laterally in the direction of its axis responsive to this thrust and in so doing a thrust bearing 48 forces a thrust washer 47 into contact with a toggle 46. The free or movable end of the toggle 46 bears against a dash pot piston 45 compressing a thrust spring 43, thus controlling the lateral motion of the shaft 34.

The lateral motion of the shaft 34 causes it to move a pin 36, normally in contact therewith, and which in turn bears against an adjustable stud bolt 37. The stud bolt 37 is mounted on a rocker arm 38. The rocker arm 38 is pivoted at the rocker support 49 and is normally biased towards the pin 36 by means of a tension spring 39.

An overload on the rake causing a sufficient lateral movement of the shaft 34 to throw the rocker arm 38 out of its normal position brings the upper portion of the rocker arm into contact with the "off" button of an overload cutout switch 40 (see also Fig. 8). This switch 40 is a standard push button switch in circuit with the motor 19.

The upper extremity of the rocker arm 38 supports a slotted tongue plate 41' engaging the toggle of a standard toggle switch 41. The same motion of the rocker arm which disconnects the motor by means of the switch 40 throws the toggle switch 41 "on" setting in operation an alarm bell 42 or any other appropriate alarm device. The resetting of these two switches is a manual operation so that the apparatus may not be started, or the alarm cut off, without manual supervision. This manual supervision assures the removal of the obstruction causing the overload on the apparatus.

In the operation of the mechanism, the rake 12 rises adjacent the forward face of the bar screen 11, (see Figs. 1 and 3) and picks up débris accumulated thereon. This débris is removed from the rake by a scraper bar 21, after the rake has passed beyond the upper end of the bar screen 11. To this end, the scraper bar 21 is bolted or otherwise appropriately secured to the extremities of two rods 30 pivotally supported at 30' (see Figs. 3 and 4). As the rake moves upwardly, after leaving the bar screen 11, it engages the scraper bar 21 (now in its initial position) at a point appropriately distant from the end or tip of the rake. Continued upward movement of the rake carries the scraper bar 21 upwardly (about its pivot 30') and outwardly across the end portion of the rake, whereby the débris on the rake is scraped off and falls onto a discharge apron 20.

When the scraper bar 21 has been thus moved to the extremity of the rake 12, and continued movement of the rake carries the latter out of contact with the bar, the scraper bar falls by gravity to its initial position. The shock of this fall is taken up by springs 31 upon which the rods 30 rest when the scraper bar is in its initial position.

The apron 20 is carried on a frame 20' pivotally mounted at 28 and is biased to its normal or initial position by a counterweight 29. The frame 20' lies in the path of the rake 12, after the latter has passed upwardly beyond the bar screen, and is moved back (about its pivot 28) by the upwardly moving rake, thereby carrying the apron 20 out of the way of the rake. When the rake has passed beyond the upper extremity of the apron 20, the counterweight 29 returns the frame and apron to their initial positions, with the apron in position to catch the débris subsequently scraped from the rake by the bar 21.

The débris slides by gravity down the rearwardly sloping surface of the apron and is deposited upon any appropriate conveying apparatus or upon a drainage platform 27 from which it may be removed in any appropriate manner. The apron 20 prevents the débris from falling back on the bar screen 11 and serves at the same time as an elevated loading platform under which appropriate conveying means may be mounted. The rake 12, relieved of its load of débris follows the path A (see Fig. 1) remote from the bar screen to the bottom of the channel 10 and the cycle is repeated.

The specific rake operating mechanism hereinbefore described and illustrated in the accompanying drawings is to be taken as merely explanatory of the principles of the present invention. Various modifications may be made of this operating mechanism without departing from the spirit of the invention. In this respect the invention contemplates an operating mechanism that imparts a reciprocatory-like movement to a substantially rigid supporting element for the scraper so that the scraper moves in a closed path in one direction in proximity to the screen and in the opposite direction appropriately spaced from the screen. The driving mechanism is arranged to carry the point of application of the driving force in a path conforming in configuration to the predetermined desired path of movement of the scraper but remote therefrom. The operating mechanism is supported at a relatively stationary point (shaft 26) and at a relatively movable point (shaft 16); these two points (or shafts) and the edge of the scraper being always maintained in a substantially straight line or in substantially the same plane.

One of the particular advantages of the scraping device of the invention is that all the moving or wearing parts are not only accessible but remote from the corrosive influences of the sewage or other liquor undergoing screening. There is no drip or backflow from rotating parts which would tend to corrode moving parts of the mechanism. There is a minimum of mechanism within the sewage channel at any time and nothing which tends to materially obstruct or impede the flow of sewage. There are no rotating or geared parts in the stream of sewage to become clogged or corroded. The employment of a worm drive tends to keep an excessive load on the rake from reversing the drive. The pantograph form of mechanism makes it possible by changing only the shape of the rack and guide to adapt the one mechanism to any shape of existing bar screen, whether straight or curved without material changes in existing equipment in the treatment plant. The fact that substantially all the mechanism is above the sewage channel also makes it readily adaptable to existing equipment without extensive and expensive alterations.

I claim:

1. The combination with a screen of a scraping device therefor comprising a scraper, a substantially rigid supporting element for said scraper, and means for imparting a substantially reciprocatory movement to said element in the course of which said scraper moves in one direction in proximity to said screen and returns in the opposite direction appropriately spaced from the screen, the movements of said scraper away from and towards said screen being mechanically and positively effected independent of the medium through which the scraper moves.

2. The combination with a screen of a scraping device therefor comprising a scraper, supporting means for said scraper, and driving mechanism for said supporting means arranged to carry the point of application of the driving force thereto in a path conforming to the predetermined desired path of movement of said scraper.

3. The combination with a screen of a scraping device therefor comprising a scraper, supporting means for said scraper, means for moving said supporting means so that said scraper moves in proximity to said screen in one direction and appropriately spaced from the screen in the opposite direction, and means whereby the point of application of the force moving said supporting means travels in a path conforming to the path of travel of said scraper.

4. The combination with a screen of a scraping device therefor comprising a scraper, an operating mechanism for said scraper supported at two points, one of which is relatively stationary and the other of which is relatively movable, and means cooperating with said mechanism for moving said relatively movable supporting point in a path conforming to the predetermined desired path of movement of said scraper.

5. The combination with a screen of a scraping device therefor comprising a scraper and an operating mechanism adapted to move said scraper in one direction in proximity to said screen and in the opposite direction appropriately spaced from the screen, said operating mechanism having two points of support one of which is relatively stationary and the other of which is relatively movable, and means cooperating with said mechanism for moving said relatively movable supporting point in a path conforming to the path of movement of said scraper.

6. The combination with a screen of a scraping device therefor comprising a scraper and an operating mechanism adapted to move said scraper in one direction in proximity to said screen and in the opposite direction appropriately spaced from the screen, said operating mechanism having two points of support one of which is relatively stationary and the other of which is relatively movable, and means cooperating with said mechanism for moving said relatively movable supporting point in such manner that said two supporting points and said scraper are always maintained in a substantially straight line.

7. The combination with a screen of a scraping device therefor comprising a scraper and an operating mechanism adapted to move said scraper in a closed path one part of which path is in proximity to said screen and another part of which path is appropriately spaced from the screen, said operating mechanism having two points of support one of which is relatively stationary and the other of which is relatively movable, and means cooperating with said mechanism for moving said relatively movable supporting point in a closed path remote from but conforming in configuration to the path of movement of said scraper.

8. The combination with a screen of a scraping device therefor comprising a scraper and operating mechanism adapted to move said scraper in one direction in proximity to said screen and in the opposite direction appropriately spaced from the screen, said operating mechanism including a relatively stationary shaft and a relatively movable and rotatably mounted shaft, means for guiding said movable shaft and means whereby rotation of said relatively movable shaft carries that shaft through a path of movement remote from but conforming in configuration to the path of movement of said scraper.

9. The combination with a screen of a scraping device therefor comprising a scraper and operating mechanism adapted to move said scraper in one direction in proximity to said screen and in the opposite direction appropriately spaced from the screen, said operating mechanism including a relatively stationary shaft and a relatively movable and rotatably mounted shaft, and means whereby rotation of said relatively movable shaft carries that shaft through a path of movement remote from but conforming in configuration to the path of movement of said scraper.

10. The combination with a screen of a scraping device therefor comprising a scraper and operating mechanism adapted to move said scraper in one direction in proximity to said screen and in the opposite direction appropriately spaced from the screen, said operating mechanism including a relatively stationary shaft and a relatively movable and rotatably mounted shaft, means for rotating said relatively movable shaft, and means whereby the rotation of said relatively movable shaft moves that shaft in such manner that the axes of said shafts and the edge of said scraper are always positioned in substantially one plane.

11. The combination with a screen of a scraping device therefor comprising a scraper and operating mechanism adapted to move said scraper in one direction in proximity to said screen and in the opposite direction appropriately spaced from the screen, said operating mechanism including a relatively stationary shaft and a relatively movable and rotatably mounted shaft, means for rotating said relatively movable shaft, means including a closed rack and cooperating pinions secured to said relatively movable shaft for carrying that shaft through a path of movement conforming to the path of movement of said scraper.

12. The combination with a screen of a scraping device therefor comprising a scraper and operating mechanism adapted to move said scraper in one direction in proximity to said screen and in the opposite direction appropriately spaced from the screen, said operating mechanism including means responsive to the load on said scraper, and means operatively associated with said load responsive means for interrupting the application of power to said mechanism when the load on the scraper exceeds a predetermined amount.

13. The combination with a screen of a scraping device therefore comprising a scraper and operating mechanism adapted to move said scraper in one direction in proximity to said screen and in the opposite direction appropriately spaced from the screen, said operating mechanism including means responsive to the load on said scraper, and an overload alarm device operatively associated with said load responsive means.

In testimony whereof I affix my signature.

JOHN H. KNOWLES.